Patented Jan. 8, 1924.

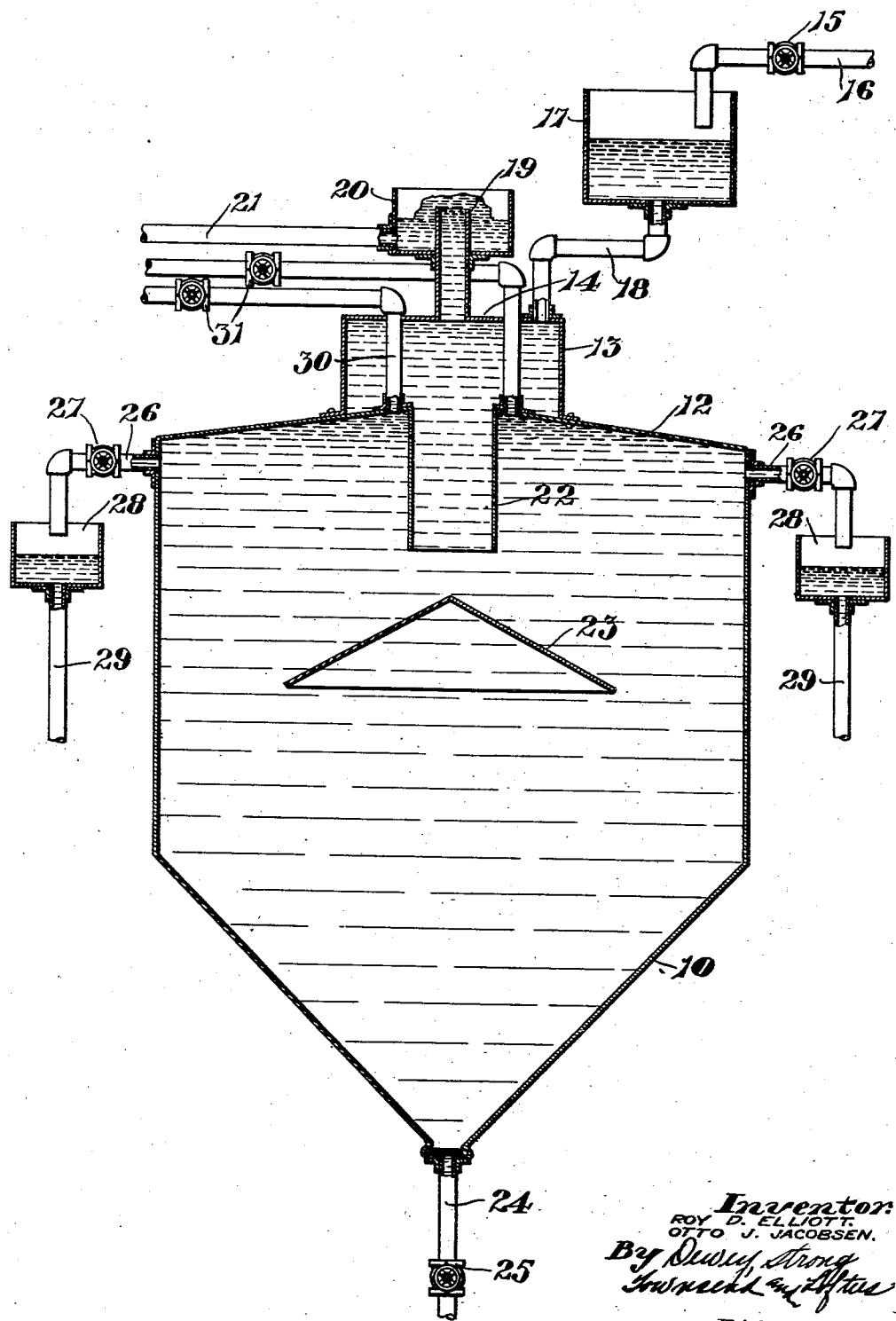

1,480,379

UNITED STATES PATENT OFFICE.

ROY D. ELLIOTT AND OTTO J. JACOBSEN, OF CROCKETT, CALIFORNIA.

SETTLING TANK.

Application filed July 5, 1922. Serial No. 572,878.

*To all whom it may concern:*

Be it known that we, ROY D. ELLIOTT and OTTO J. JACOBSEN, citizens of the United States, residing at Crockett, county of Contra Costa, and State of California, have invented new and useful Improvements in Settling Tanks, of which the following is a specification.

This invention relates to settling tanks, of the continuous type.

The invention is particularly concerned with the treatment of liquids in which it is desired to separate the bulk of clear liquid from suspended matter contained therein. The invention is characterized by the fact that it is particularly well adapted to the simultaneous separation of clear fluid medium from both solids heavier than the surrounding fluid medium and from solid containing substances commonly spoken of as foam which is lighter than the fluid medium. In the treatment of such materials in any of the well known forms of decantation or sedimentation apparatus the presence of air entangled and floating solids has heretofore presented extreme difficulty and necessitated the use of a complicated and unsatisfactory system of baffles or mechanically moving brushes or water sprays to eliminate the foam. While the present invention is particularly well adapted to the treatment of liquors containing both settling and floating solids, we do not limit its use to the treatment of such liquids, since it is equally valuable for treatment of liquids which contain settling solids and are free from floating solids and to the treatment of such liquids as may vary from time to time, sometimes containing either one or both floating and settling solids.

The present invention contemplates the use of a tank having an outlet in the bottom, through which thickened slime may be drawn, and being further provided with means for drawing off the clear separated liquid at the top of the tank. Accommodations are also made for foam which may be formed by certain liquids, and which foam in the present instance will not interfere with the separation of the liquid and the suspended solids carried thereby.

The invention is illustrated by way of example in the accompanying drawing in which the figure is a view in vertical section and elevation showing the complete apparatus with which the present invention is concerned.

In the drawings, 10 is a conical bottomed tank of any suitable size wherein the solids settle through the action of gravity. The tank has a conical shaped cover 12, riveted or otherwise made water-tight to the conical bottomed tank. A foam eliminator 13 is provided which may be in the form of a short cylinder made water-tight to the conical cover 12. This foam eliminator is fitted with a water-tight cover 14. A valve 15 is placed in the supply line 16 which supplies the feed trough 17. The feed trough 17 should be located at an elevation of from one or more feet above the top of the foam eliminator 13. A pipe 18 leads from the feed trough 17 through the top of the foam eliminator. An upright overflow pipe 19 leads just through the cover of the foam eliminator and extending upwards to a point a few inches below the bottom of the feed trough 17. Built around the overflow pipe 19 is a suitable trough 20 through which the overflow is caught and conveyed away by conduit 21. A feed well 22 extends from the bottom of the foam eliminator down into the settling tank. The length of this feed well will vary somewhat with the concentration of the solids in the material being handled, the concentration of the thickened sludge and other factors which can best be determined by actual trial on the material being treated. Below and at a distance of about a foot or two from the bottom of the feed well is located a baffle or deflecting plate 23 which serves the purpose of preventing the thickened sludge in the conical bottom of the tank 10 from being stirred up by the current of incoming material through the feed well 22. This deflecting plate 23 is preferably, though not necessarily, conical in shape and supported by any suitable means not shown, such as for example strap iron supports either to the feed well or the sides or bottom of the tank. The thickened sludge is drawn off through a pipe 24, this pipe being controlled by a valve 25. The tank is formed with outlets 26 through which the clear liquid may be drawn off. These outlets are controlled by valves 27. Hoppers 28 receive the clear liquid from outlet pipes 26 and convey it to the conduit 29. In order to permit the foam to be drawn off when the tank is first filled, pipes 30 are provided. These pipes are led up through the foam eliminator and may be closed as the tank is filled by valves 31.

In operation of the present invention a supply of liquid bearing a substance to be separated therefrom is delivered through the pipe 16 as regulated by the valve 15. This liquid flows into the feed trough 17 and then passes by gravity through pipe 18 to the foam eliminator 13. It is to be understood that at this time valve 25 in the bottom of the tank is closed, as well as the valves 27 at the top of the tank. As the tank fills with liquid it will pass downwardly over the conical deflecting plate 23 and the suspended solid matter in the liquid will gradually settle in the conical bottom of the tank. As the tank fills up the foam will float on top of the liquid and will be forced outwardly through pipes 30.

It will be noted that a certain amount of foam will accumulate upon the body of the liquid in the trough 17 and will not pass down into the settling tank. Other liquid will overflow from the pipe 19 and in fact it has been noted that a large accumulation of foam will take place in the trough 20 which surrounds the opened upper end of the overflow pipe 19. When the tank has been filled and the excessive amount of foam has been drawn off through the pipes 30 and valves 31 of these pipes are closed and from then on the foam automatically overflows through the overflow pipe 19. At the same time valves 25 and 27 are opened. Thus the sludge will drain out from the bottom of the tank and the clear separated liquid may be drained off through pipes 26 into the hoppers 28.

It is intended that a constant flow of liquid shall be circulated through the settling apparatus at all times, and with that in mind, the valve 15 is set to regulate the flow of incoming liquid. This may be adjusted by reference to the overflow pipe 19 and the amount of foam and liquid which there accumulate.

It will thus be seen that by regulating the various valves a very effective continuous separation of liquid, suspended solid matter, and entrained air may be brought about with great ease and with certainty of result.

While we have shown the preferred form of our invention as now known to us, it will be understood that various changes might be made in the combination, construction and arrangement of parts by those skilled in the art, without departing from the spirit of the invention as claimed.

Having thus described our invention, what we claim and desire to secure by Letters Patent is:

1. A device of the character described comprising a container into which a liquid is pored, a settling tank to receive the liquid draining from the container, said tank being formed with a substantially cylindrical body portion, a central tubular passageway extending downwardly through the top of the tank and into the body thereof, a dome carried upon the top of the tank and inclosing the opening in said tube and into which dome the liquid directly drains from the filling tank, an overflow pipe extending upwardly from the dome, and a launder surrounding the mouth of said overflow pipe.

2. A device of the character described comprising a container into which a liquid is pored, a settling tank to receive the liquid draining from the container, said tank being formed with a substantially cylindrical body portion, a central tubular passageway extending downwardly through the top of the tank and into the body thereof, a dome carried upon the top of the tank and inclosing the opening in said tube and into which dome the liquid directly drains from the filling tank, an overflow pipe extending upwardly from the dome, and a conical baffle plate disposed beneath the opening of the central tubular inlet to create a zone of substantially stagnant liquid near the bottom of the tank.

3. A device of the character described comprising a container into which a liquid is pored, a settling tank to receive the liquid draining from the container, said tank being formed with a substantially cylindrical body portion, a central tubular passageway extending downwardly through the top of the tank and into the body thereof, a dome carried upon the top of the tank and inclosing the opening in said tube and into which dome the liquid directly drains from the filling tank, an overflow pipe extending upwardly from the dome, and a conical baffle plate disposed beneath the opening of the central tubular inlet to create a zone of substantially stagnant liquid near the bottom of the tank, drain pipes communicating with the tank near the top thereof for draining off the clear liquid, and a valve-controlled outlet at the bottom of the tank for drawing off the suspended solid matter.

4. A device of the character described comprising a container into which a liquid is pored, a settling tank to receive the liquid draining from the container, said tank being formed with a substantially cylindrical body portion, a central tubular passageway extending downwardly through the top of the tank and into the body thereof, a dome carried upon the top of the tank and inclosing the opening in said tube and into which dome the liquid directly drains from the filling tank, an overflow pipe extending upwardly from the dome, a conical baffle plate disposed beneath the opening of the central tubular inlet to create a zone of substantially stagnant liquid near the bottom of the tank, drain pipes communicating with the tank near the top thereof for draining off the clear liquid, a valve-controlled outlet at the bottom of the tank for drawing off the suspended solid matter, and means for initially drawing off the foam accumulating in the top of the tank.

ROY D. ELLIOTT.
OTTO J. JACOBSEN.